United States Patent [19]

Jacques et al.

[11] 4,033,867
[45] July 5, 1977

[54] CHROMATE REDUCTION IN AQUEOUS MEDIUM

[75] Inventors: Donald F. Jacques, Cornwells Heights; K. Robert Lange, Huntingdon Valley, both of Pa.

[73] Assignee: Betz Laboratories, Inc., Trevose, Pa.

[22] Filed: Oct. 31, 1975

[21] Appl. No.: 627,629

Related U.S. Application Data

[63] Continuation of Ser. No. 489,962, July 19, 1974, abandoned.

[52] U.S. Cl. .............. 210/28; 210/38 B; 210/50; 210/51; 210/DIG. 30; 423/55; 423/607

[51] Int. Cl.² .............................. C02C 5/02

[58] Field of Search .......... 75/108, 109, 101 BE; 210/28, 38, 42, 50, 51, 59, DIG. 30; 423/53–55, 607, 644, 656

[56] References Cited

UNITED STATES PATENTS

| | | | |
|---|---|---|---|
| 2,760,844 | 8/1956 | Fox | 423/607 |
| 2,879,134 | 3/1959 | Halpern | 423/607 |
| 3,666,447 | 5/1972 | Saubestre | 75/108 |
| 3,681,210 | 8/1972 | Sievers et al. | 210/38 |
| 3,716,485 | 2/1973 | Robertson | 210/50 |
| 3,725,259 | 4/1973 | Depree | 210/38 |
| 3,761,381 | 9/1973 | Yagishita | 210/38 |
| 3,810,542 | 5/1974 | Gloster et al. | 210/50 |

OTHER PUBLICATIONS

Watson, *Pollution Control in Metal Finishing*, 1973, pp. 90–95.
Morrison, "Cr Recovery from Plating Solutions" *Ion Exchange Technology*, p. 321–332, 1956.
Literature Review, WPCFJ, vol. 45, 1973, p. 1195.

*Primary Examiner*—Thomas G. Wyse
*Assistant Examiner*—Peter A. Hruskoci
*Attorney, Agent, or Firm*—Alexander D. Ricci

[57] ABSTRACT

A method for reducing the residual chromate level in effluent waters comprising catalytic reduction of the chromate ion by hydrogen to the trivalent chromium state and removal of the chromium by passage through a cation exchange resin column or by base precipitation in a settling pond.

6 Claims, No Drawings

CHROMATE REDUCTION IN AQUEOUS MEDIUM

This is a continuation of application Ser. No. 489,962, filed July 19, 1974, now abandoned.

BACKGROUND OF THE INVENTION

Chromate treatments have been the backbone for some years in the control of corrosion, deposition, scaling and general fouling in industrial cooling water systems. Environmental concern for waste-water quality has given rise to legislative standards requiring low levels of chromate in discharged waste water. Some proposed standards favor zero chromate discharge. Obviously, the alternatives to industries using chromates are either to discontinue use and find substitutes, or to reduce or remove chromates from the effluent waters. This invention is concerned with the latter alternative, and in developing a chromate reduction process which will minimize cost to industry and be relatively easy to maintain in use.

Prior art methods of chromate reduction generally involve reduction of the hexavalent chromate ion to the trivalent chromium ion followed by elevation of pH for precipitation of the reduced chromium, or anion exchange removal. Reducing agents employed most commonly for this purpose include sulfur dioxide, ferrous sulfate, sodium bisulfate sodium metabisulfate, sodium sulfite and hydrogen sulfide. The reduced chromium precipitates out as chromium hydroxide upon elevation of pH, if precipitation is used for removal.

The basic problem with use of the above reducing agents is the lack of selectivity in the reduction step. Methods using ferrous or other oxidizable metal ions or sulfur dioxide require high chemical feed rates since the entire cooling water blowdown must be treated to reduce the small quantity of chromate present. Also, use of iron results in the production of ferric hydroxide upon neutralization, which is extremely difficult to remove from water. Use of sulfur dioxide is costly since the amount employed must be sufficient to reduce the chromate and any other reducible substances in the water, including dissolved oxygen. The anion exchange method of removing chromate puts chromate in competition with other divalent or trivalent anions present and selectivity is low, resulting in high chromium leakage and incomplete resin utilization. The precipitation method of removal requires higher costs due to the necessity of a sedimentation tank of sophisticated design to handle the chromium hydroxide sludge, followed by transfer to a lagoon which must be large enough to handle flows of 25 to 50 gallons per minute or higher from the tanks. However, where enough land is available, this method is perfectly acceptable.

SUMMARY OF THE INVENTION

The method of this invention overcomes these prior art problems.

Water containing an undesirably high level of chromate ion ($CrO_4^-$) is lowered to a pH level of from near zero to 2.8, then is passed through a catalytic reduction column where it is contacted with hydrogen in the presence of a hydrogenation catalyst, such as palladium or platinum, to reduce the chromate ion to the trivalent chromic ion ($Cr^{+3}$), then is raised to a pH of from about 3.5 to 4.0, then is either passed through a calcium-form cation exchange resin column to remove the chromic ion, or is sent to a precipitation area where the pH is raised to a high level to settle out the chromium as chromium hydroxide. Residual chromium levels as $Cr^{+3}$ of 0.5 to 1 part per million are obtained with ion exchange. If essentially zero discharge is desired, a limestone polishing step may be added.

DETAILED DESCRIPTION OF THE INVENTION

Because of the problems associated with the best-known chromate reducing agent, sulfur dioxide, in that at least 2.5 and as high as 7 to 9 times the stoichiometric amount of chromate present is required to achieve complete reduction, we arrived at the novel idea of using hydrogen with a catalyst. Hydrogen is a poor reducing agent without such an agent. It was found that either palladium or platinum supported on various surfaces, preferably carbon, provided adequate reactive area for the hydrogen to reduce the chromate to chromium as $Cr^{+3}$. Other known catalytic materials could also be employed, and the above two choices should not be deemed exhaustive. Reduction is accomplished independently of dissolved oxygen amount.

A. Reduction of $CrO_4^{-2}$ by Hydrogen

Catalytic methods have the advantage of high specificity with proper choice of catalyst and conditions. A review of the above uneconomical prior art situation led to the idea of testing hydrogen as the reducing agent using a catalyst, such as palladium-on-charcoal. It was found that reduction did proceed independently of volume fed, and most important, depended on amount of chromate ion present. Interference is low, even the presence of pure oxygen does not prevent chromate ion reduction or increase the amount of hydrogen needed.

A preferred method for reducing chromium from the $Cr^{+6}$ (chromate) state to the $Cr^{+3}$ (chromic) state is as follows. Water containing a high chromate level is preferably passed through filters such as activated charcoal, to remove miscellaneous impurities, although this filter step is not essential. The pH of the filtered water is then adjusted and controlled by the addition of acid at a level of from near zero to about 2.8, and preferably from about 2.0 to about 2.5. This step can be automated by use of a mix tank with a pH controller. The water flow is next channeled to a catalytic column containing the catalyst-on-substrate, water inlet and outflow means, and hydrogen inlet means. The hydrogen may be supplied from tanks or by electrolysis of water. The volume of catalyst required is approximately one-half of the blowdown rate. Amount of hydrogen fed should be approximately the stoichiometric amount required for substantially complete reduction of the $CrO_4^{-2}$ to $Cr^{+3}$.

Two examples of the above preferred reduction process follow.

EXAMPLE 1

Influent containing a chromate-based corrosion inhibitor, in the amount of 20 parts per million of water as $CrO_4^{-2}$, was fed through a system as described above. 60 ml. of 0.5% palladium on charcoal was used in the catalytic column. Temperature of the water was held at about 25° C, and pH controlled at 2.0. Additionally, in the middle of the run, the catalyst was regenerated with hydrogen peroxide at a pH of 8.5 to test the effectiveness of this form of regeneration. The water feed rate into the catalytic column was maintained at 30 ml per minute. The following chart details the reduction results versus cumulative water volume influent passing through the catalytic column. Special conditions are noted where necessary, including hydrogen feed rates. Excess hydrogen by electrolysis was used with upflow co-current with the liquid feed.

TABLE 1

| Cumulative Volume Influent (ml) | Conditions | Effluent $CrO_4^{-2}$ (ppm) |
|---|---|---|
| 2000 | $H_2$ rate = 37 ml/min | 1.6 |
| 12000 | $H_2$ turned off here | 2.2 |
| 15000 | No $H_2$ | 2.4 |
| 18000 | $H_2O_2$ catalyst regeneration | — |
| 19000 | $H_2$ on at 33 ml/min | 1.6 |
| 59500 | $H_2$ rate at 31 ml/min | 1.5 |
| 80000 | $H_2$ rate at 31 ml/min | 1.5 |

The above results indicate that, in a long run, the catalyst has sufficiently long use life, having processed 2000 times its own volume at the 12,000 ml point, with little activity loss. The $H_2O_2$ regeneration has no bad effects. Also the process maintained approximately 92% reduction of the chromate influent throughout the run.

EXAMPLE 2

This run is identical to Example 1 except that the catalyst was 0.25% palladium on charcoal.

TABLE 2

| Cumulative Volume Influent (ml) | Conditions | Effluent $CrO_4^{-2}$ (ppm) |
|---|---|---|
| 13,500 | $H_2$ rate = 39 ml/min | 1.2 |
| 30,000 | $H_2$ rate = 31 ml/min | 1.5 |
| 44,000 | $H_2$ rate = 30 ml/min | 1.6 |
| 69,000 | $H_2$ rate = 30 ml/min | 1.3 |

Again, the process is seen to be very effective in $CrO_4^{-2}$ reduction over the long term.

The above two examples were run on a lab scale, using a small basket containing the catalyst in a beaker and introducing electrodes for the electrolysis of water and production of hydrogen. These lab runs were also performed at non-optimum conditions to discover minor problems not otherwise observable. Additional conclusions reached during this phase of experimentation were, that platinum catalysts were just as effective as palladium; that hydrogen has considerable solubility in palladium, thus creating a reserve should hydrogen feed fail; and that water hardness was not a factor. The best mode of carrying out this invention is exemplified as follows.

EXAMPLE 3

The above process was scaled up by constructing a column containing 440 cc of 0.5% palladium on charcoal which was fed upflow using water with a $CrO_4^{-2}$ concentration as high as 65 ppm and at flow rates as high as 260 cc/minute. The pH maintained at various levels during 1 month and variations of the flow rate were made to test catalyst efficiency. Hydrogen was supplied by an external tank concurrently with the liquid feed. This run confirmed that reduction was essentially complete if pH was kept below about 2.8. Throughout the month, less than 0.02 ppm $CrO_4^{-2}$ appeared in the effluent at space velocities ranging from 0.2 to 3 volumes of feed per volume of catalyst with influent chromate levels as high as 60 ppm.

B. Removal of Reduced $Cr^{+3}$ by Ion Exchange

The most preferred method of removal of the reduced chromic ion from water is by flow through cationic exchange resins. The great advantage over base precipitation is the saving of the real estate required for lagooning in the latter method. The advantage over anionic exchange has been mentioned before.

The preferred method makes use of water containing the freshly reduced $Cr^{+3}$ species from the process of part A above. The pH of water exiting the catalytic column is raised to and controlled at between about 3.5 and 4.0 to avoid chromium hydroxide formation on the resin surface. The water is introduced into a column containing a cationic exchange resin preferably in the calcium-form; i.e., regenerant is solution of a calcium salt. Very low levels of $Cr^{+3}$ appear in the column effluent.

It has been found that, if cationic resins in the hydrogen form are used for chromium exchange, a breakthrough or surge in the effluent $Cr^{+3}$ level occurs at cyclic intervals, after which the $Cr^{+3}$ level falls to a more acceptable figure. When the calcium-form resin is used, no such cyclic leakage occurs and results are consistently and steadily at low levels of $Cr^{+3}$.

EXAMPLE 4

A run using a cation resin known as Amberlite 252 in the calcium form is described to show the utility of this form of $Cr^{+3}$ removal. A cylindrical column of 2.5 cm diameter containing 325 ml. of the resin was constructed. A simulated cooling water solution containing 30 ppm chromate ion was reduced using the method of part A above, resulting in a $Cr^{+3}$ level of about 13.5 ppm. The water from the catalytic column was treated with sodium hydroxide to raise its pH to 3.5. The water was then fed to the exchange column at a rate of 1 gallon per minute per cubic foot of resin volume. The effluent $Cr^{+3}$ level varied from 0.7 to 1.2 ppm up through 1700 gallons influent per cubic foot of resin. No sudden surges in chromium level were observed.

Typical residual chromium levels vary from 0.5 to 1.0 ppm as $Cr^{+3}$. While it is not certain, this chromium species is theorized to be strongly olated form of low charge density that could not be exchanged.

Suitable regenerant calcium solutions will be obvious to those in the art. It has been found that a 10% $CaCl_2 \cdot 2H_2O$ solution at a pH of 3.0 is quite sufficient for treating an exhausted calcium-form cationic resin.

C. Trace $Cr^{+3}$ Removal With Limestone

If near zero $Cr^{+3}$ levels are required before the effluent can be released into a sewer or stream, a limestone column may be added as a polishing step.

EXAMPLE 5

A limestone column (Mississippi Lime Co., Pulverized Limestone, Code R-1) was added to a system having the reduction process of this invention followed by a cationic exchange column as described in part B. A pH 3.5 effluent from a calcium-form Amberlite 252 column containing a purposely high 2.5 ppm $Cr^{+3}$ was fed downflow into the limestone column at a rate between 1.6 and 2.3 gallons per minute per cubic foot of limestone. The column effluent contained undetectable quantities of $Cr^{+3}$ and pH between 8.0 and 9.1. At flow rates up to 37 or 38 GPM/ft$^3$, a pH of near neutral is still possible.

D. Base Precipitation of Reduced $Cr^{+3}$

Another acceptable, though not preferable, method of $Cr^{+3}$ removal after catalytic reduction of the chromate species, is precipitation of $Cr^{+3}$ by means of hydroxyl ion addition to the catalytic column effluent. Base precipitation is well known and thus will not be discussed here at length. After passage of the chromium-containing water through the reduction process of part A, generally lime or caustic may be added to it to bring the pH between about 8.5 and 9.5, producing a gelatinous, strongly-hydrated precipitate of chromium hydroxide which is difficult to filter. Consequently, lagooning and settling have been the most usually practiced methods for removing the chromium hydroxide from suspension, along with the use of flocculants.

We claim:

1. A method for converting chromium in the chromate form as $CrO_4^{-2}$, to the chromic form as $Cr^{+3}$, said chromium forms being dissolved in an aqueous medium, which comprises (a) controlling the pH of said aqueous medium at near zero to about 2.8; and (b) contacting said aqueous medium at said pH with hydrogen in the presence of a hydrogenation catalytic material on a charcoal substrate, said material being selected from the group consisting of platinum and palladium.

2. The method of claim 1 where said catalytic material is palladium.

3. The method of claim 2 where the pH of said medium is controlled between 2.0 and 2.5 inclusive.

4. A method for removing chromium from an aqueous medium, said chromium largely being present in said medium in the chromate form as $CrO_4^{-2}$, which comprises sequentially: (a) reducing the chromium from the chromate form to the chromic form as $Cr^{+3}$ by controlling the pH of the medium at near zero to about 2.8, and then contacting said medium at said pH with hydrogen in the presence of a hydrogenation catalytic material on a charcoal substrate, said material being selected from the group consisting of platinum and palladium; (b) adjusting the pH of the medium containing the reduced chromic form to about 3.5 to about 4.0; and (c) contacting the medium at said pH with a cationic exchange resin in the calcium form so as to remove most of the reduced chromic form from the medium onto the resin.

5. The method of claim 4 further comprising, in sequence, contacting the resin effluent with limestone such that substantially all the residual chromium is removed as chromium hydroxide.

6. A method for removing chromium from an aqueous medium, said chromium largely being present in said medium in the chromate form as $CrO_4^{-2}$, which comprises sequentially: (a) reducing the chromium from the chromate form to the chromic form as $Cr^{+3}$ by controlling the pH of the medium at near zero to about 2.8, and then contacting said medium at said pH with hydrogen in the presence of a hydrogenation catalytic material on a charcoal substrate, said material being selected from the group consisting of platinum and palladium.

* * * * *